United States Patent
Bhosale et al.

(10) Patent No.: US 10,457,092 B2
(45) Date of Patent: Oct. 29, 2019

(54) WHEEL WEIGHT ASSEMBLY

(71) Applicant: Deere & Company, Moline, IL (US)

(72) Inventors: Digvijay Bhosale, Pune (IN);
Benjamin J. Heimbuch, Waterloo, IA (US)

(73) Assignee: DEERE & COMPANY ONE JOHN DEERE PLACE, Moline, IL (US)

( * ) Notice: Subject to any disclaimer, the term of this patent is extended or adjusted under 35 U.S.C. 154(b) by 83 days.

(21) Appl. No.: 15/712,755

(22) Filed: Sep. 22, 2017

(65) Prior Publication Data

US 2019/0092092 A1    Mar. 28, 2019

(51) Int. Cl.
*B60B 15/28*    (2006.01)

(52) U.S. Cl.
CPC ........ *B60B 15/28* (2013.01); *B60B 2310/305* (2013.01); *B60B 2320/16* (2013.01); *B60B 2340/50* (2013.01)

(58) Field of Classification Search
CPC ................ B60B 15/28; B60B 2340/50; B60B 2310/305; B60B 2320/16
USPC ........................................................ 301/53.5
See application file for complete search history.

(56) References Cited

U.S. PATENT DOCUMENTS

| | | | |
|---|---|---|---|
| 1,957,338 A | | 5/1934 | Hecht et al. |
| 2,859,065 A | * | 11/1958 | Darby .................... B60B 15/28 301/53.5 |
| 5,116,106 A | * | 5/1992 | Hardesty ................. F16F 15/34 301/53.5 |
| 6,132,007 A | * | 10/2000 | Harmsen ................. B60B 15/28 301/53.5 |
| 6,283,556 B1 | | 9/2001 | Taylor |
| 8,944,521 B2 | * | 2/2015 | Roth ....................... B60B 15/28 301/53.5 |
| 2001/0011842 A1 | * | 8/2001 | Rockl ....................... B60B 3/12 301/35.632 |
| 2010/0231030 A1 | * | 9/2010 | Eaton ................... A63H 17/262 301/53.5 |
| 2013/0342002 A1 | * | 12/2013 | Roth ....................... B60B 15/28 301/53.5 |

(Continued)

FOREIGN PATENT DOCUMENTS

| | | |
|---|---|---|
| DE | 4419198 A1 | 12/1994 |
| EP | 2033808 B1 | 2/2013 |
| EP | 2676807 A1 | 12/2013 |

OTHER PUBLICATIONS

German Search Report issued in counterpart application No. 102018212954.1 dated Jul. 22, 2019. (12 pages).

*Primary Examiner* — S. Joseph Morano
*Assistant Examiner* — Jean W Charleston

(57) ABSTRACT

A wheel weight assembly for a vehicle that has a wheel hub. The wheel weight assembly includes a wheel weight and a mounting assembly. The wheel weight includes a mounting aperture that defines a fixed axis. The mounting assembly is positioned in the mounting apertures and pivots relative thereto. The mounting assembly includes a hook and a rotator. The hook is positioned laterally inboard of the wheel hub, while the rotator is positioned laterally outboard of the wheel weight and is coupled to the hook. The rotator is configured to rotate the hook from a first position to a second position. In the first position, the hook not engaged with the wheel hub, but in the second position, the hook is engaged with the wheel hub.

15 Claims, 11 Drawing Sheets

(56) References Cited

U.S. PATENT DOCUMENTS

2016/0341276 A1 11/2016 Rockl et al.

* cited by examiner

US 10,457,092 B2

WHEEL WEIGHT ASSEMBLY

FIELD OF THE DISCLOSURE

The present disclosure relates to a wheel weight assembly for use on a work vehicle.

BACKGROUND OF THE DISCLOSURE

Wheel weight assemblies are used on work vehicles, such as agricultural tractors and construction machines. Known wheel weight assemblies can be time consuming and difficult to mount to the work vehicle, and likewise they can be difficult and time consuming to remove. Many such assemblies include long bolts that extend outwardly from the vehicle. Mounting a heavy wheel weight onto such bolts is difficult, because the weight needs to be carefully lifted, held, and aligned with the bolts. Removing the weight presents similar kinds of challenges.

SUMMARY OF THE DISCLOSURE

Disclosed is a wheel weight assembly for a vehicle that has a wheel hub. The wheel weight assembly includes a wheel weight and a mounting assembly. The wheel weight includes a mounting aperture that defines a fixed axis. The mounting assembly is positioned in the mounting aperture and pivots relative thereto. The mounting assembly includes a hook and a rotator. The hook is positioned laterally inboard of the wheel hub, while the rotator is positioned laterally outboard of the wheel weight and is coupled to the hook. The rotator is configured to rotate the hook from a first position to a second position. In the first position, the hook is not engaged with the wheel hub, but in the second position, the hook is engaged with the wheel hub.

With such a wheel weight assembly, during installation, the wheel weight can hook onto the wheel hub, and then the other hooks are rotated from their respective first positions and into their second positions. Once all of the hooks are in the second positions and retained with mounting fasteners, the wheel weight is secure and the vehicle is ready for use.

Mounting the wheel weight with this assembly and in this manner is easy and efficient, and removing the wheel weight offers these same benefits. Additionally, mounting the wheel weight in such a way does not require any kind of adapter plate positioned between the wheel weight and the wheel hub. Rather, the wheel weight mounts directly to the wheel hub.

BRIEF DESCRIPTION OF THE DRAWINGS

The detailed description of the drawings refers to the accompanying figures in which.

Like reference numerals in the various drawings indicate like elements.

DETAILED DESCRIPTION OF THE DRAWINGS

Figure 1:
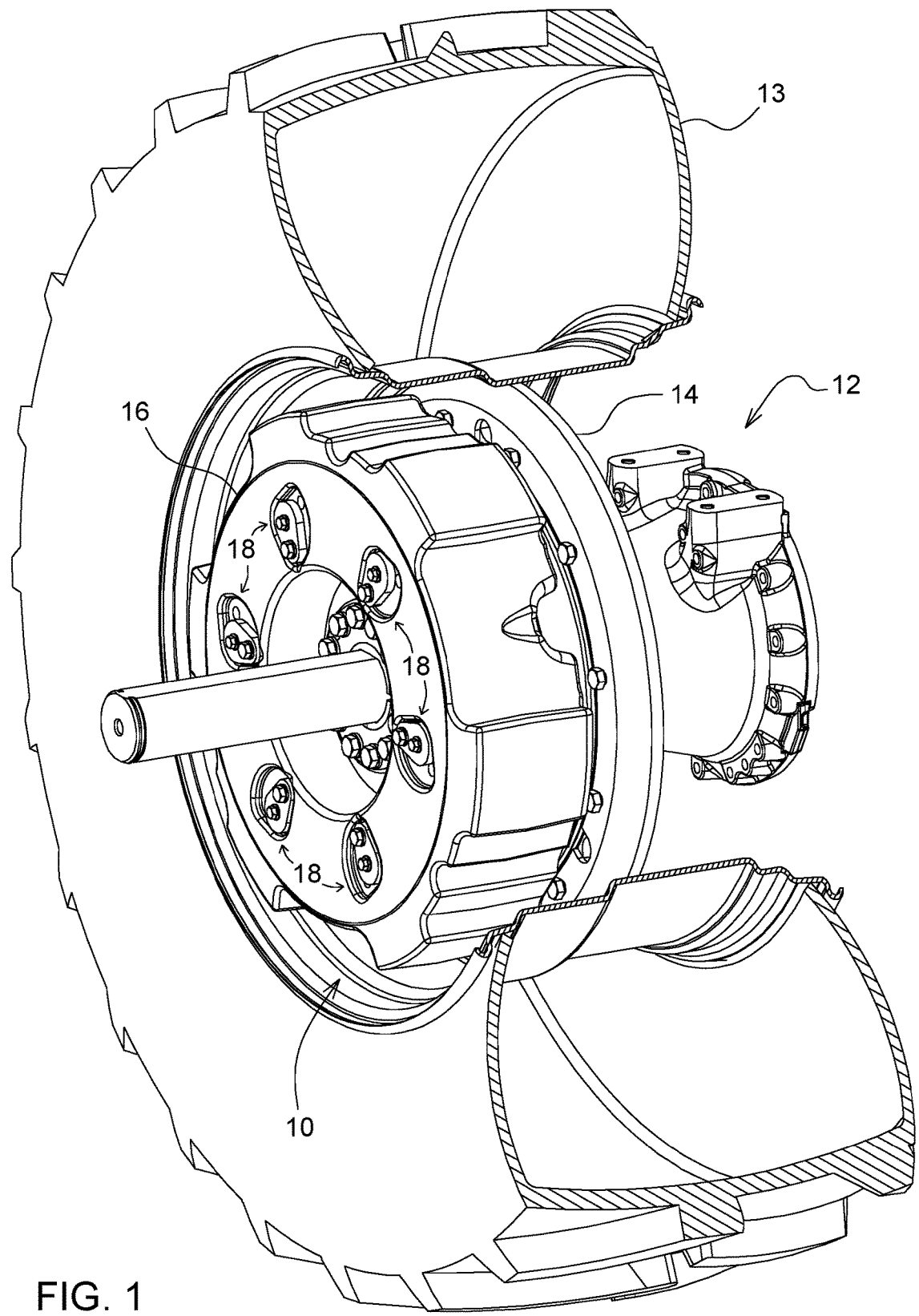
FIG. 1 is a front perspective view of a wheel weight assembly that is mounted to a final drive of a vehicle.

Referring to FIG. 1, there is shown a wheel weight assembly 10 for a vehicle that has a wheel hub 14. The hub 14 is mounted to a final drive 12 of the vehicle, and surrounding the wheel weight assembly 10 and the hub 14 is a tire 13. The vehicle may be an agricultural tractor, a construction machine, or any other kind of vehicle that may require additional ballast. Providing additional ballast to a vehicle may aid in increasing the traction of the vehicle and may aid in improving the weight distribution of the vehicle.

The weight assembly 10 includes a weight 16 and a plurality of mounting assemblies 18. Though the illustrated embodiment of the weight assembly 10 is shown with six mounting assemblies 18, other embodiments may have any number of mounting assemblies 18.

Referring to FIGS. 2-10, the mounting assembly 18 is positioned in a mounting aperture 20 of the weight 16. The mounting aperture 20 defines a fixed axis 22, and the mounting assembly 18 pivots relative to the mounting aperture 20 and relative to the fixed axis 22. The mounting aperture 20 is shown as having two different diameters, but other embodiments may have greater or fewer different diameters, depending on, for example, the design the mounting assemblies 18.

The mounting assembly 18 includes a hook 24 and a rotator 26. When the weight 16 is near or in contact with the hub 14, the hook 24 is positioned laterally inboard of the hub 14, and the rotator 26 is positioned laterally outboard of the weight 16.

Figure 5:
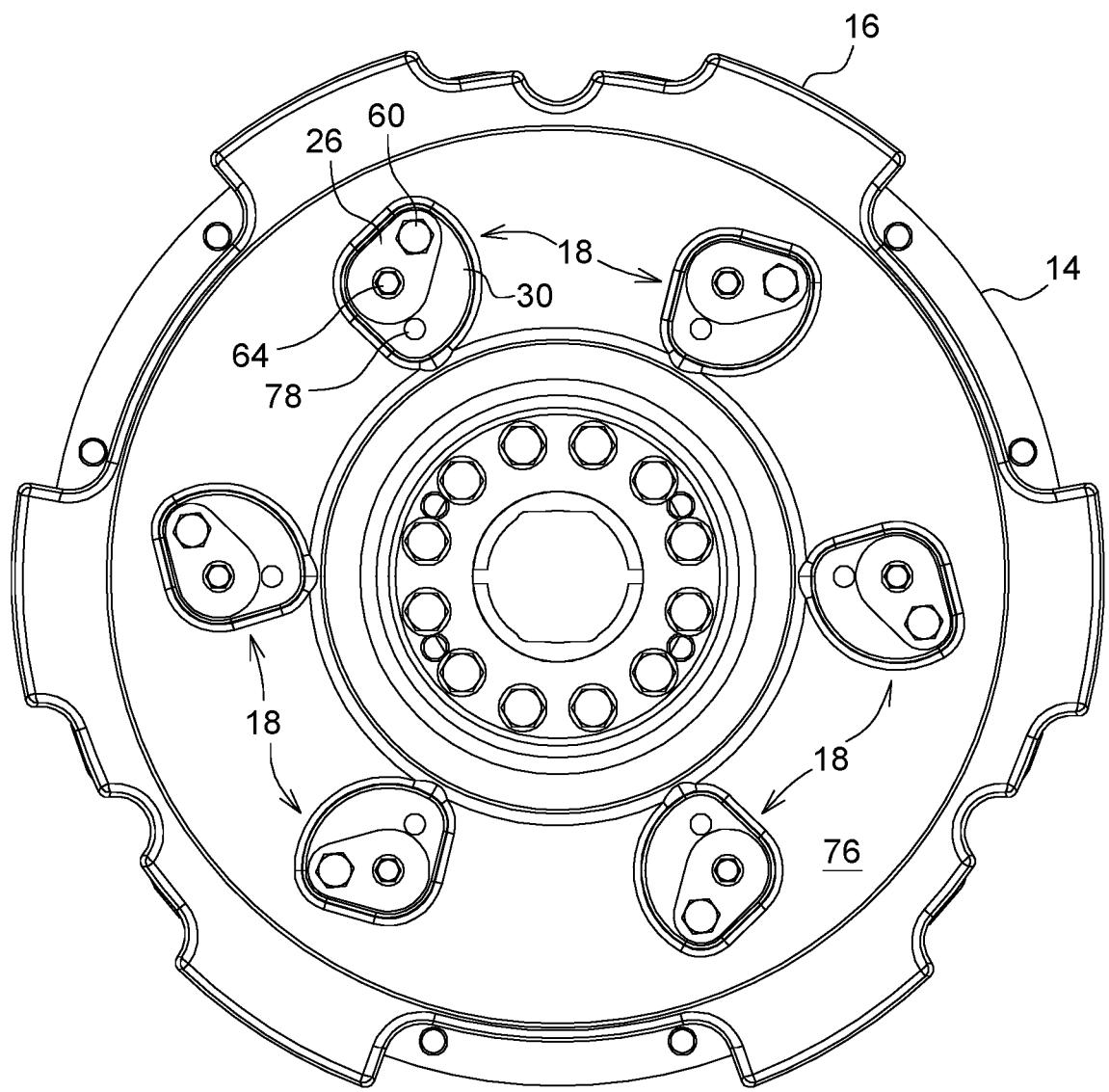
FIG. 5 is a front elevational view of the wheel weight assembly, in which each of the mounting assemblies are in a first position.
Figure 6:
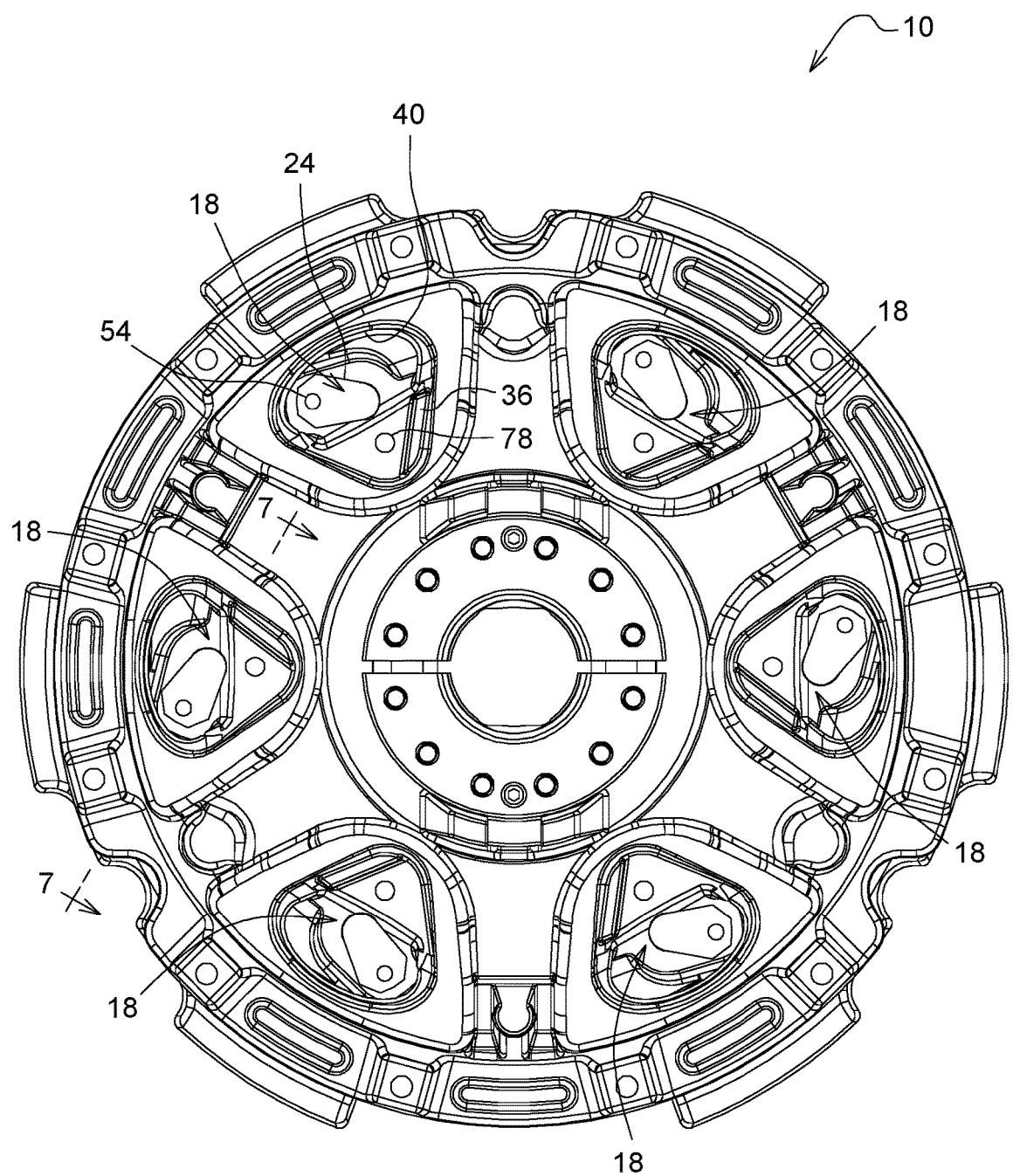
FIG. 6 is a back elevational view of the wheel weight assembly, in which hooks of each of the mounting assemblies are in the first position.
Figure 7:
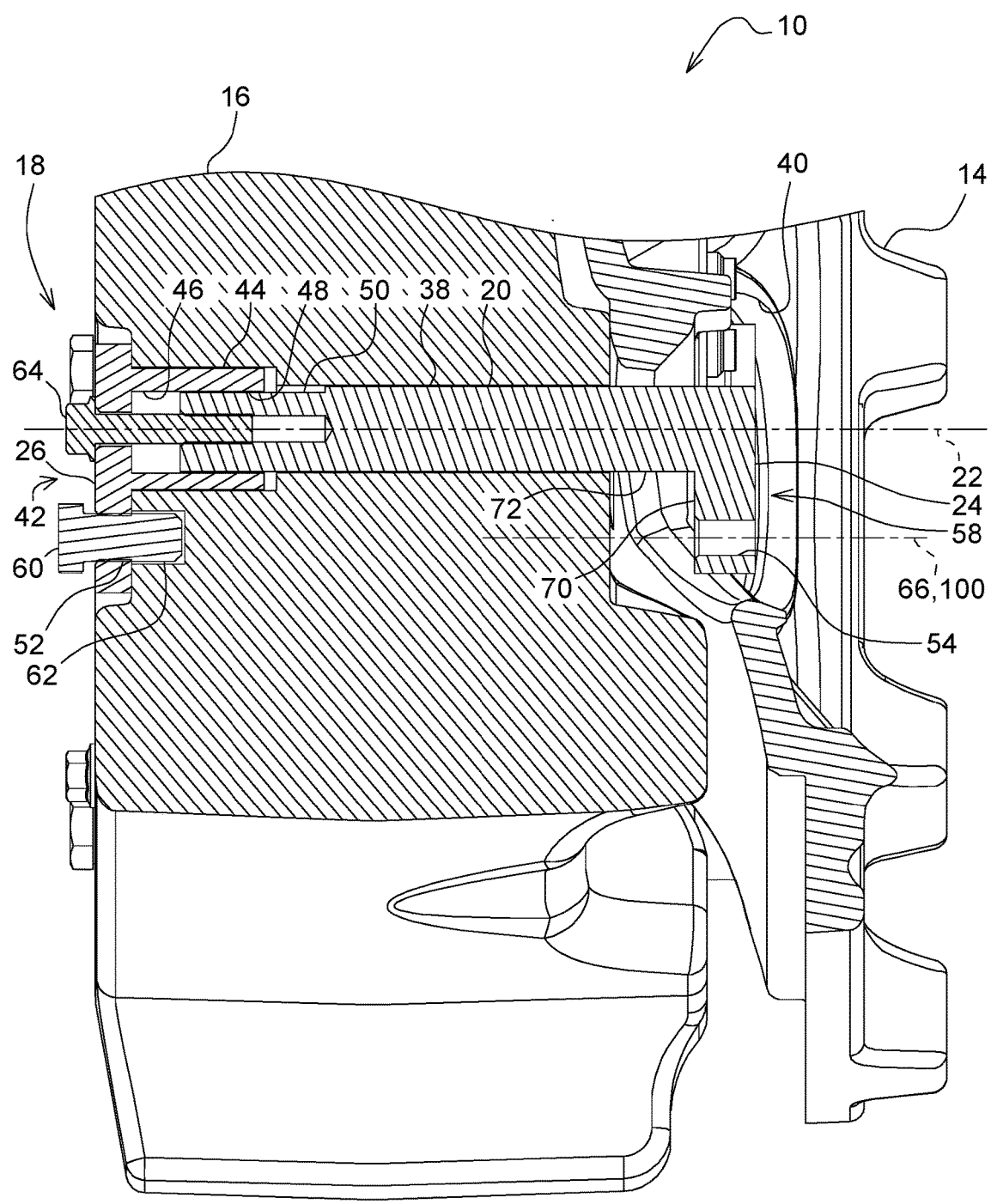
FIG. 7 is a sectional view taken along lines 7-7 of FIG. 6, showing the mounting assembly and showing the hook in the first position.
Figure 8:
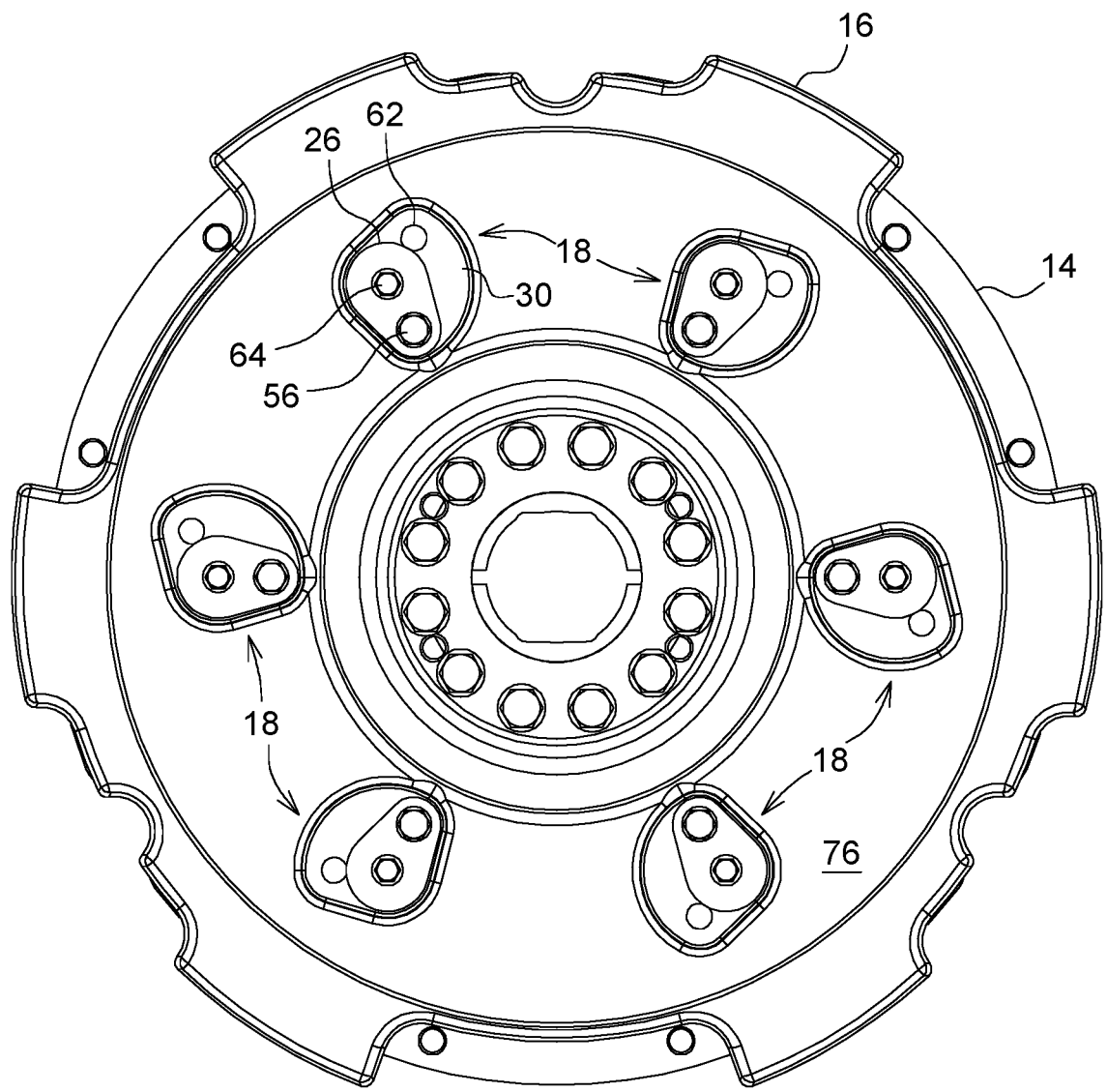
FIG. 8 is a front elevational view of the wheel weight assembly, in which each of the mounting assemblies are in a second position.
Figure 9:
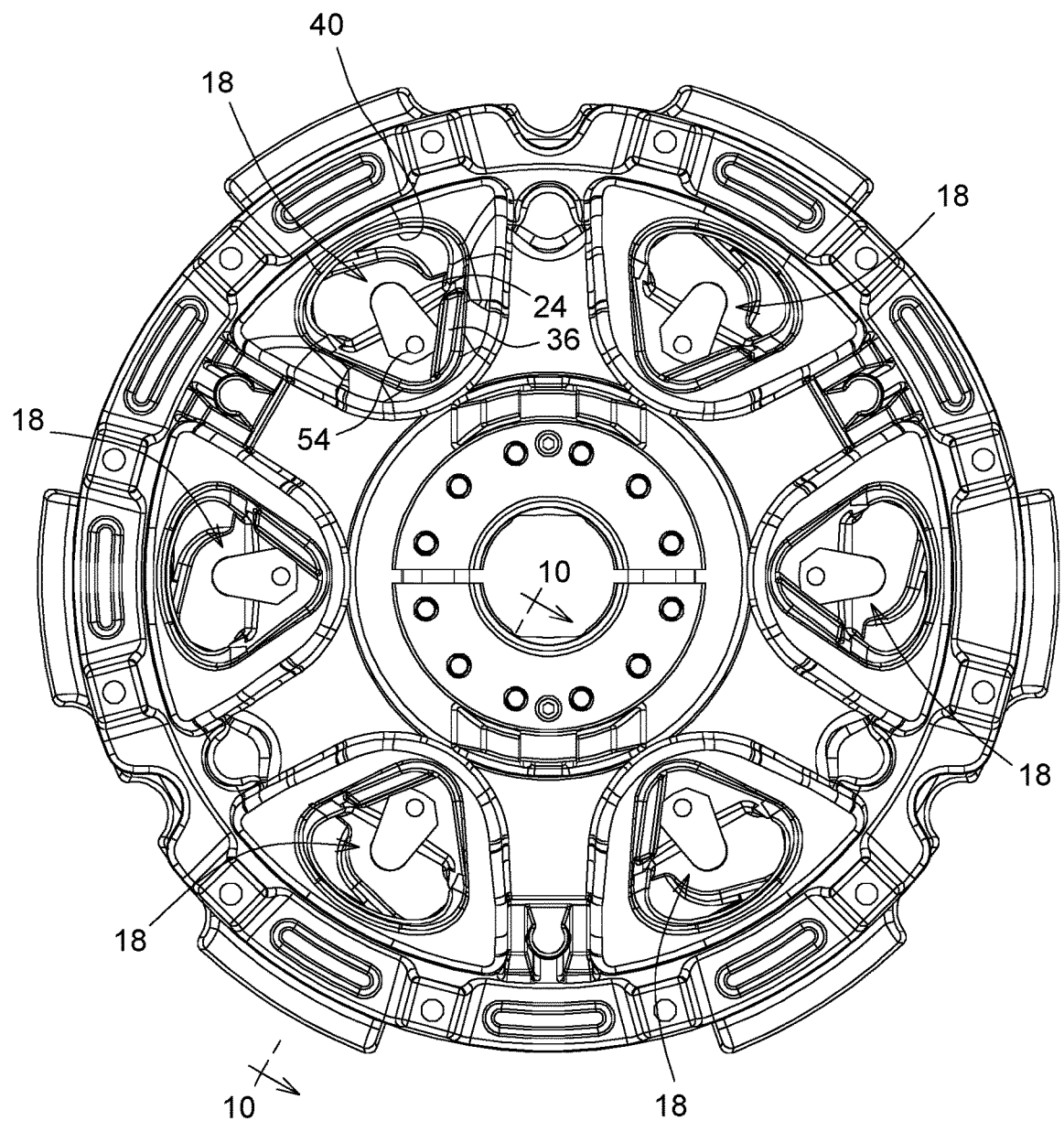
FIG. 9 is a back elevational view of the wheel weight assembly, in which hooks of each of the mounting assemblies are in the second position.
Figure 10:
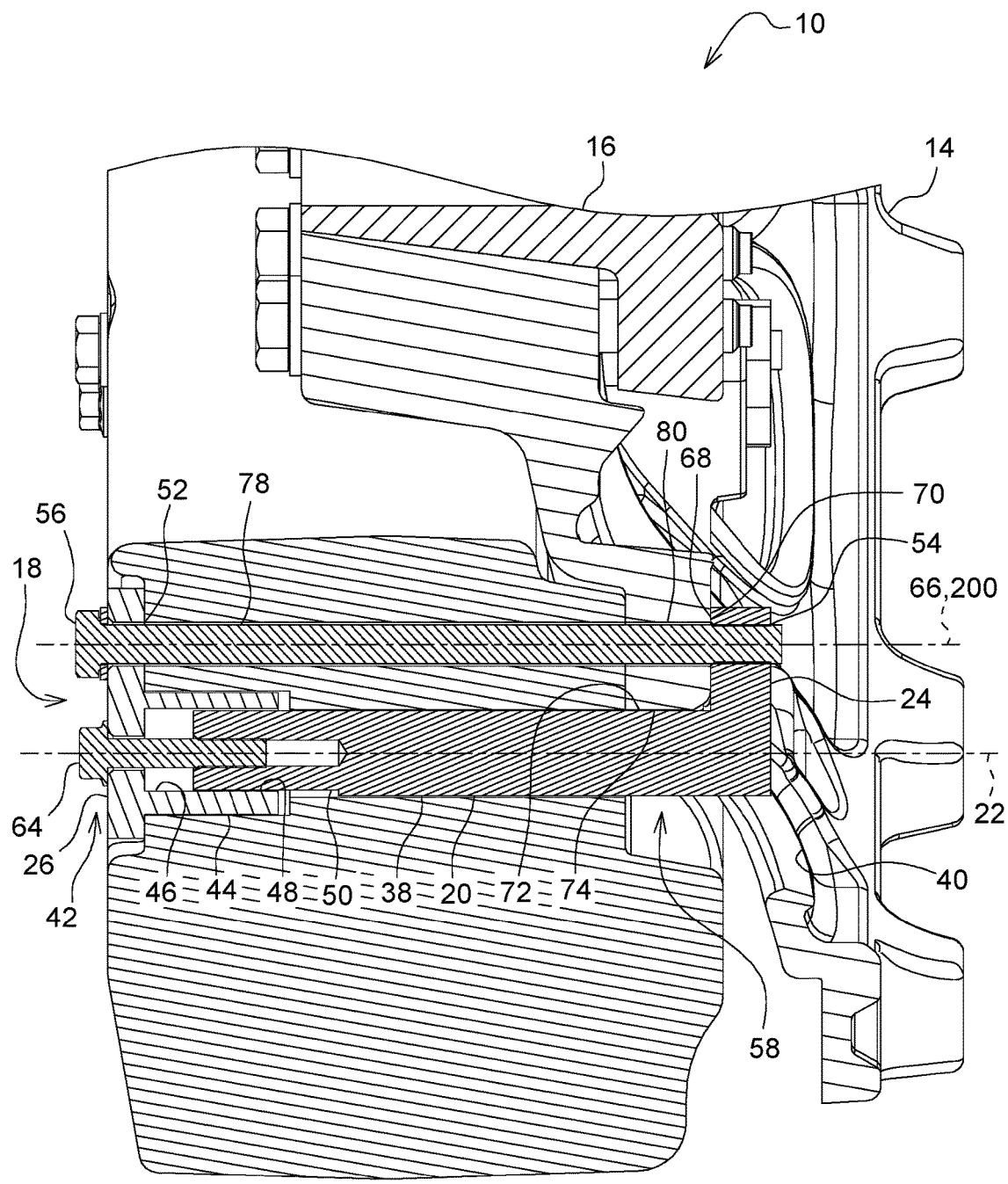
FIG. 10 is a sectional view taken along lines 10-10 of FIG. 9, showing the mounting assembly and showing the hook in the second position.

In the first position 100, as shown in FIGS. 5-7, the hook 24 is not engaged with the hub 14 and does not in any way overlap or interfere with the hub 14. Thus, the first position 100 may be used for mounting and removing the weight 16. Alternatively, in the second position 200, as shown in FIGS. 8-10, the hook 24 is engaged with the hub 14. When each of the hooks 24 are in the second position 200 and secured with, for example, mounting fasteners 56, the weight 16 is securely mounted to the hub 14 and the vehicle is ready for use.

As shown in FIGS. 7 and 10, for example, the hook 24 may be part of a hook pin 58 that also includes a post 38. The hook 24 and the post 38 may be, for example, welded together or formed into one another (i.e., a unitary design). The hook 24 may be fixed with respect to the post 38, such that they rotate together in unison between the first and second positions 100, 200. The post 38 may be positioned in the mounting aperture 20 and in the mounting window 40 (i.e., when the weight 16 is mounted to the hub 14).

The rotator 26 may be part of a rotator assembly 42 that also includes a rotator post 44. Like post 38, the rotator post 44 may also both be positioned in the mounting aperture 20. Both the post 38 and the rotator post 44 are aligned with the fixed axis 22. The rotator 26 and the rotator post 44 may be, for example, welded together or formed into one another (i.e., a unitary design). The rotator 26 may be fixed with respect to the rotator post 44, such that the rotator 26 and the rotator post 44 rotate in unison.

The rotator 26 may include a rotator aperture 52, and the hook 24 may include a hook aperture 54. The rotator aperture 52 is always aligned with the hook aperture 54, so as to define a moving axis 66 that circumnavigates the fixed axis 22 as the hook 24 rotates between the first and second positions 100, 200.

The rotator post 44 may include a hollow receiver 46, and the post 38 may be positioned inside of the hollow receiver 46. The hollow receiver 46 may include an anti-rotation surface 48. And further, the post 38 may include a complimentary anti-rotation surface 50 that contacts the anti-rotation surface 48, so as to ensure that the rotator post 44 and the post 38 rotate in unison between the first and second positions 100, 200.

As illustrated, an assembly fastener 64 may be used to couple the rotator assembly 42 to the hook pin 58. In other embodiments, the rotator assembly 42 and the hook pin 58 may be threaded into one another or coupled together via some other means.

When the hook 24 is in the second position 200, the mounting assembly 18 may include a mounting fastener 56 that is positioned in the rotator aperture 52, in an aperture 78 of the weight 16, in an aperture 80 of the hub 14, and in the hook aperture 54. The mounting fastener 56, in cooperation with the rest of the mounting assembly 18, secures the weight 16 to the hub 14, so that the weight 16 cannot slip off of vehicle during operation thereof.

Figure 2:
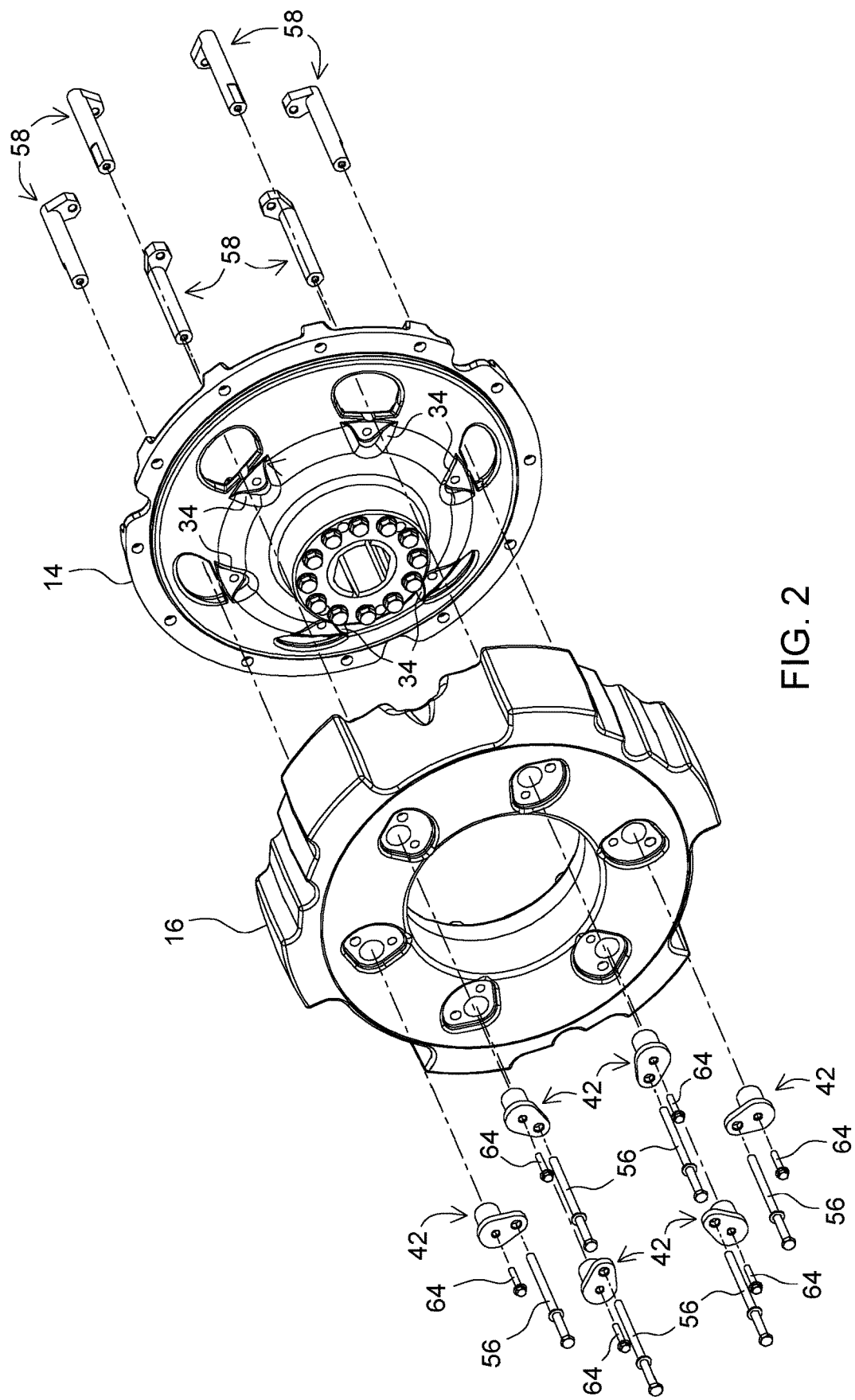
FIG. 2 is an exploded front perspective view of the wheel weight assembly.
Figure 3:
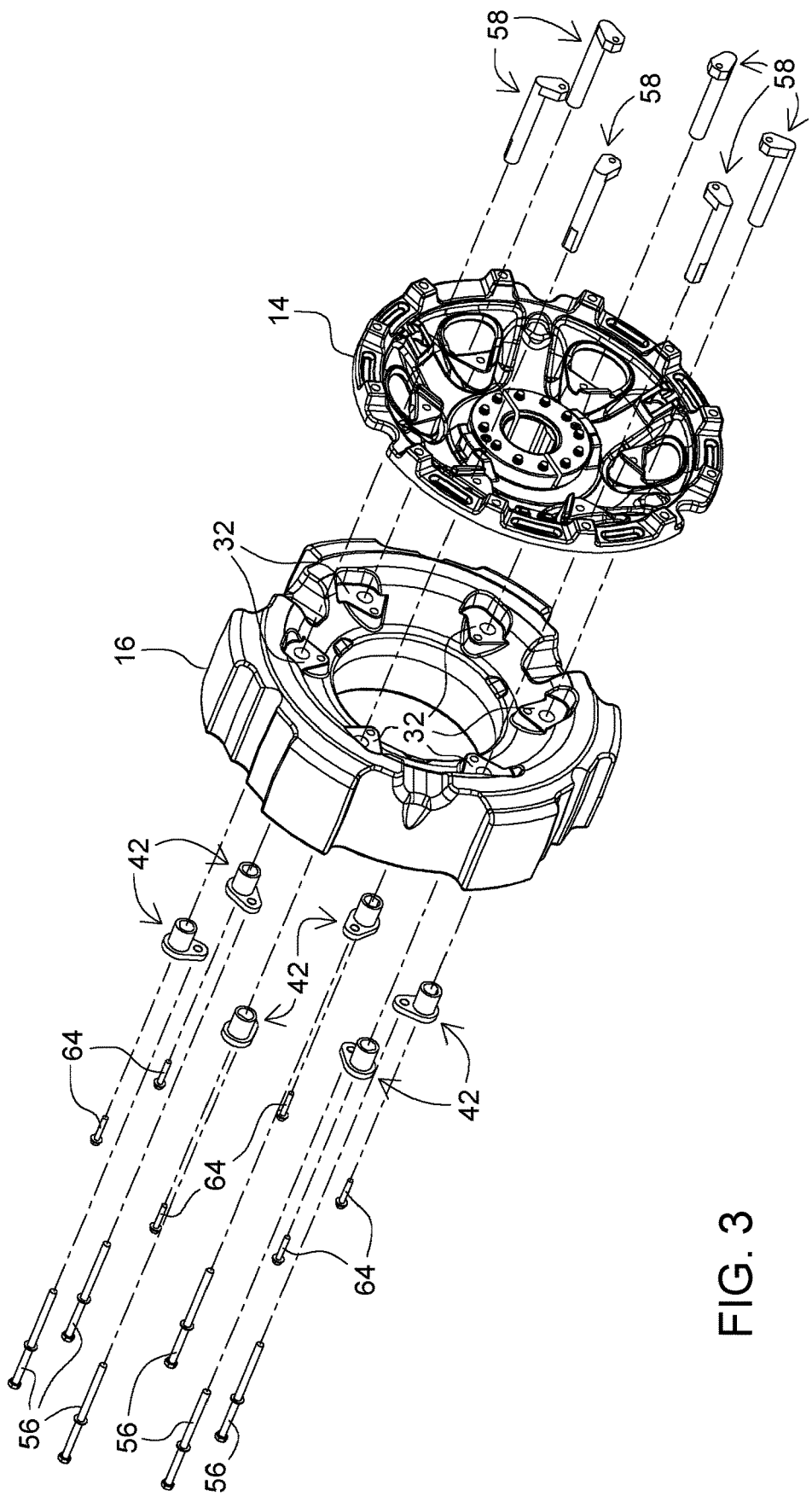
FIG. 3 is an exploded rear perspective view of the wheel weight assembly.
Figure 4:
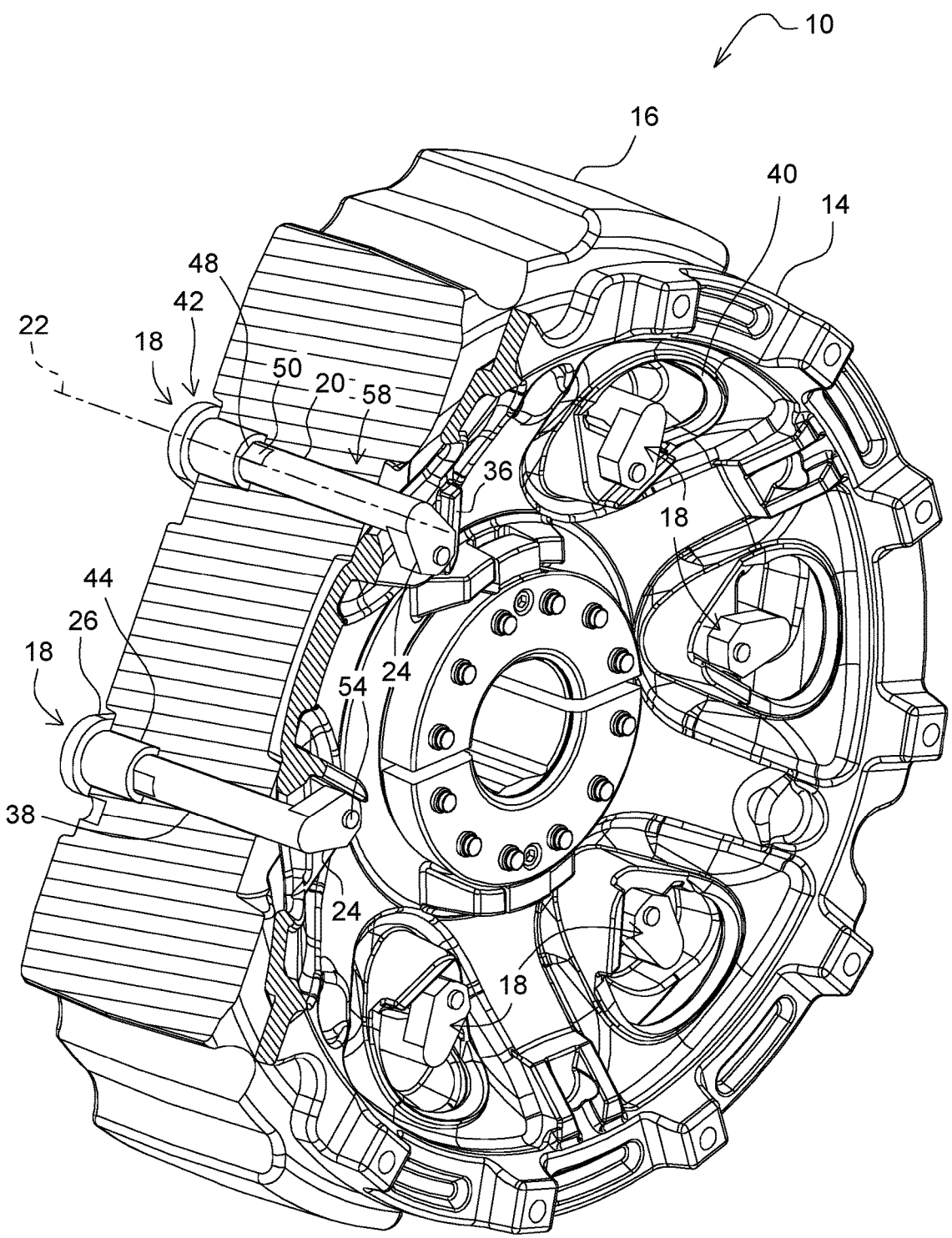
FIG. 4 is a back perspective view of the wheel weight assembly, portions of which are broken away so as to highlight a pair of mounting assemblies.

As shown in FIGS. 2-3, to aid in aligning the weight 16, at least one of the weight 16 and the hub 14 may include an aligner 32, while the other may include an alignment slot 34. In the illustrated embodiment, the weight 16 includes six aligners 32, and the hub 14 includes six respective alignment slots 34. Other embodiments of the weight 16 may include any number of aligners 32 and alignment slots 34. The aligners 32 are complimentary in shape to the alignment slots 34, so that the aligners 32 may slide into and be positioned in the alignment slots 34 (when one or more of the hooks 24 are in the second position 200). In the illustrated embodiment, the fixed axis 22 intersects the aligners 32. In other embodiments, the aligners 32 may be spaced apart from the fixed axis 22 and also apart from the mounting assemblies 18.

The rotator 26 may be used by an operator to rotate the hook 24 from a first position 100 to a second position 200. When the hook 24 is in the second position 200, the hook 24 engages with the hub 14, such that the hook 24 and the rotator 26 sandwich the weight 16 and the hub 14 together. When sandwiched by multiple hooks 24 that are locked into place with their respective mounting fasteners 56, the weight 16 and hub 14 cannot be separated from one another.

When the hook 24 is in the second position 200, the hook 24 may extend radially inward so as to overlap a laterally inboard surface 68 of the hub 14. In this position, a laterally outboard surface 70 of the hook 24 may be in contact with the laterally inboard surface 68 of the hub 14, and further a radially inward surface 72 of the post 38 may be in contact with a radially outward surface 74 of the hub 14.

As shown in FIGS. 5 and 8, a laterally outboard surface 76 of the weight 16 may include a recess 30 that is intersected by the fixed axis 22. The rotator 26 may be in contact with the recess 30. A first edge of the recess 30 may be positioned, so as to align the rotator 26 and the hook 24 into a first position 100 (i.e., to prevent the hook 24 from rotating past the first position 100). And similarly, a second edge of the recess 30 may be positioned, so as to align the rotator 26 and the hook 24 into the second position 200 (i.e., to prevent the hook 24 from rotating past the second position 200). The first and second edges of the recess 30 promote easy installation and removal of the weight 16.

As shown in FIGS. 6 and 9, to further aid in rotating the hook 24 into the second position 200, a laterally inboard side of the hub 14 may include a rotation limiter 36. The rotation limiter 36 is configured to align the hook 24 into the second position 200 (i.e., to prevent the hook 24 from rotating past the second position 200), so as to further promote easy installation of the weight 16.

During certain conditions, such as the condition shown in FIG. 7, the weight assembly 10 may also include a threaded bolt 60 for forcing the mounting assembly 18 laterally outward relative to the hub 14 (i.e., during removal of the weight assembly 10 and the weight 16). The laterally outboard side of the weight 16 may include an unthreaded blind aperture 62, and the rotator aperture 52 may be a threaded rotator aperture 52. The threaded bolt 60 may be positioned in the unthreaded blind aperture 62 and also in the threaded rotator aperture 52. When the threaded bolt 60 is rotated in the apertures 62, 52, it forces the mounting assembly 18 laterally outwards. By having the hooks 24 in the first position 100 and by forcing the mounting assemblies 18 laterally outwards, the weight 16 can be removed from the hub 14 and placed into storage. The weight 16 may be removed, so as to service the vehicle or to decrease the weight of the vehicle (i.e., in response to differing field conditions and vehicle applications).

Figure 11:
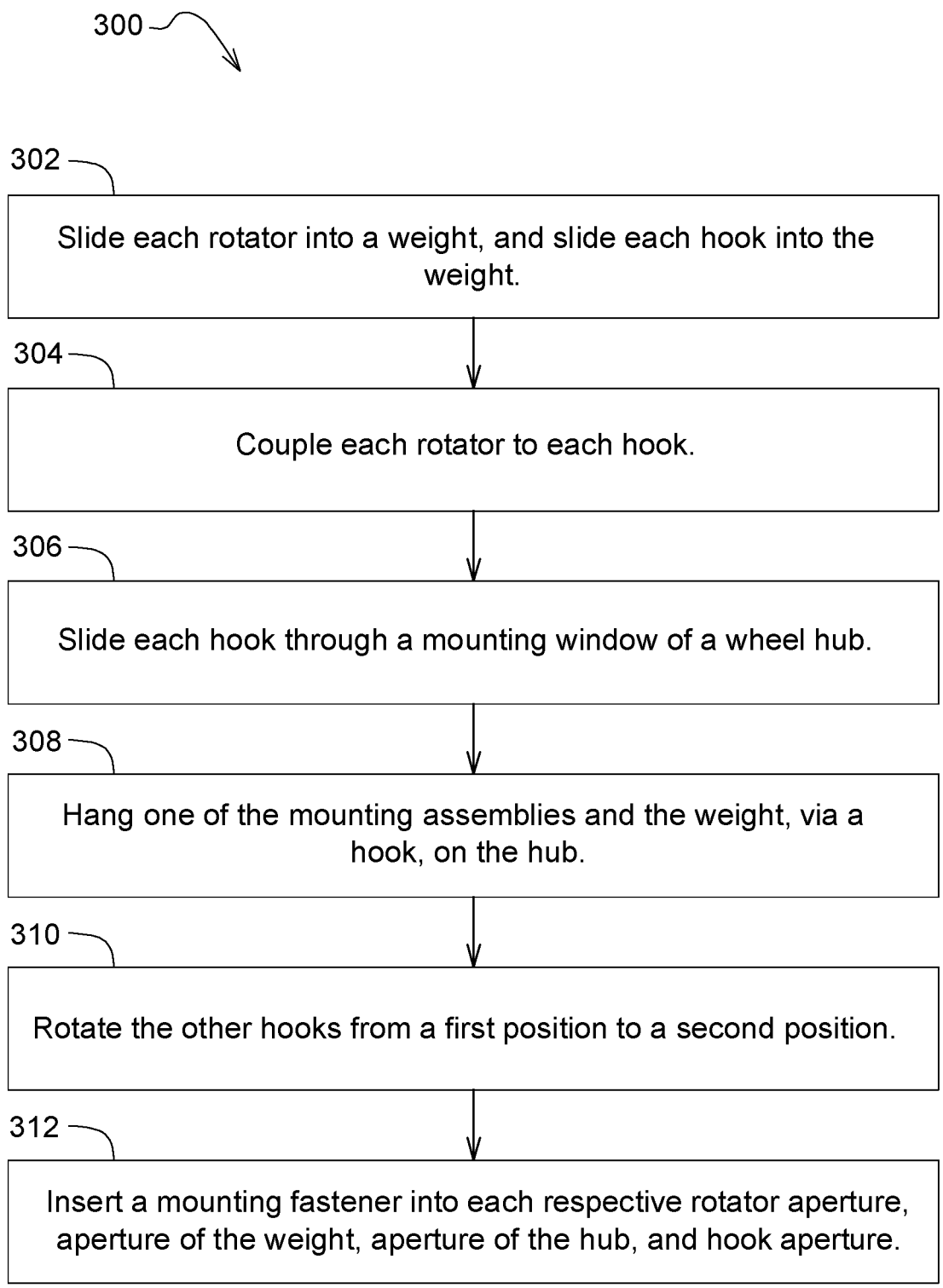
FIG. 11 is a method for mounting a wheel weight onto a wheel hub.

Referring to FIG. 11, there is shown in a method 300 for mounting a weight 16 onto a hub 14. The method 300 may be performed by an operator, such as (for example) a factory installer, a service technician, or a person who will operate the vehicle.

In act 302, the operator slides each rotator 26 into the weight 16 starting from a laterally inboard side of the weight 16, and he slides each hook 24 into the weight 16 starting from a laterally inboard side of the weight 16.

In act 304, the operator, couples each rotator 26 to each respective hook 24. As shown, the rotator 26 and the hook 24 may be coupled together using the assembly fastener 64 or a similar means (e.g., threaded onto one another).

In act 306, the operator inserts at least one of the hooks 24 through a mounting window 40 of the hub 14.

In act 308, the operator hangs the weight 16, via one of the hooks 24, on the hub 14. In doing this, the hook 24 is placed laterally inboard of the hub 14 and engages therewith. In act 308, the operator uses the hook 24 that is positioned at the high point, or near a high point, of the weight 16 for a given rotational orientation thereof. This way, the weight 16 will hang on the hub 14 during the remaining steps of the method 300.

In act 310, the operator rotates each remaining hook 24 (i.e., the hooks 24 that were not used to hang the weight 16 in act 308) from the first position 100, in which the hook 24 is not engaged with the hub 14, to a second position 200 in which the hook 24 is engaged with the hub 14. When rotating the hooks 24 in act 310, the laterally outboard surface 70 of each hook 24 is rotated, so as to contact and overlap the laterally inboard surface 68 of the wheel hub 14.

In act 312, the operator inserts a mounting fastener 56 into each respective rotator aperture 52, aperture 78 of the weight 16, aperture 80 of the hub 14, and hook aperture 54. By having all of the hooks 24 in their second positions 200 and by having all of the mounting fasteners 56 inserted into place, the weight 16 is securely fastened to the hub 14.

The operator may remove the weight 16 by repeating steps 306, 308, 310, and 312 in reverse order.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A wheel weight assembly for a vehicle having a wheel hub, the wheel weight assembly comprising:
    a wheel weight comprising a mounting aperture, the mounting aperture defining a fixed axis; and
    a mounting assembly that is positioned in the mounting aperture so as to pivot relative thereto, the mounting assembly comprising:
        a hook that is positioned laterally inboard of the wheel hub; and
        a rotator that is positioned laterally outboard of the wheel weight and coupled to the hook, the rotator being configured to rotate the hook, about the fixed axis, from a first position, in which the hook is not engaged with the wheel hub, to a second position in which the hook is engaged with the wheel hub.

2. The wheel weight assembly of claim 1, wherein the wheel weight comprises a laterally outboard surface and a recess that is positioned laterally inboard thereof, the fixed axis intersects the recess, and the rotator is in contact with the recess when the hook is in the second position.

3. The wheel weight assembly of claim 1, wherein at least one of the wheel weight and the wheel hub comprises an aligner and the other of the wheel weight and the wheel hub comprises an alignment slot, and the aligner is positioned in the alignment slot.

4. The wheel weight assembly of claim 1, wherein a laterally inboard side of the wheel hub comprises a rotation limiter, and the rotation limiter is configured to align the hook into the second position.

5. The wheel weight assembly of claim 1, wherein the wheel weight and the wheel hub are not sandwiched, between the rotator and the hook, when the hook is in the first position, but the wheel weight and the wheel hub are sandwiched, between the rotator and the hook, when the hook is in the second position.

6. The wheel weight assembly of claim 1, wherein a hook pin comprises the hook and a post, the post is positioned in the mounting aperture and is aligned with the fixed axis, the hook is fixed with respect to the post such that the hook and the post rotate in unison.

7. The wheel weight assembly of claim 6, wherein the post extends through a mounting window of the wheel hub.

8. The wheel weight assembly of claim 6, wherein when the hook is in the second position:
    the hook extends radially inward so as to overlap a laterally inboard surface of the wheel hub;
    a laterally outboard surface of the hook is in contact with the laterally inboard surface of the wheel hub; and
    a radially inward surface of the post is in contact with a radially outward surface of the wheel hub.

9. The wheel weight assembly of claim 8, wherein the rotator comprises a rotator aperture, the hook comprises a hook aperture, and the rotator aperture is always aligned with the hook aperture so as to define a moving axis that circumnavigates the fixed axis as the hook rotates from the first position to the second position.

10. The wheel weight assembly of claim 9, wherein the mounting assembly further comprises a mounting fastener that is positioned in the rotator aperture, in an aperture of wheel weight, in an aperture of the wheel hub, and in the hook aperture when the hook is in the second position.

11. The wheel weight assembly of claim 9, further comprising a threaded bolt, wherein:
    a laterally outboard side of the wheel weight comprises an unthreaded blind aperture;
    the rotator aperture is a threaded rotator aperture; and
    the threaded bolt is positioned in the unthreaded blind aperture and the threaded rotator aperture, and the threaded bolt, when rotated, forces the mounting assembly laterally outward relative to the wheel hub.

12. The wheel weight assembly of claim 6, wherein a rotator assembly comprises the rotator and a rotator post, the rotator post is positioned in the mounting aperture and is aligned with the fixed axis, and the rotator is fixed with respect to the rotator post such that the rotator and the rotator post rotate in unison.

13. The wheel weight assembly of claim 12, wherein the rotator post comprises a hollow receiver, and the post is positioned inside of the hollow receiver.

14. The wheel weight assembly of claim 13, wherein the hollow receiver comprises an anti-rotation surface, and the post comprises a complimentary anti-rotation surface that contacts the anti-rotation surface so as to ensure that the rotator post and the post rotate in unison.

15. The wheel weight assembly of claim 13, wherein the mounting assembly further comprises an assembly fastener that is aligned with the fixed axis and configured to couple the rotator assembly to the hook pin.

\* \* \* \* \*